(12) United States Patent
Marivoet et al.

(10) Patent No.: US 11,354,059 B2
(45) Date of Patent: Jun. 7, 2022

(54) DATA MIGRATION BETWEEN STORAGE SYSTEMS USING DIFFERENT PROTOCOLS

(71) Applicant: DATADOBI CVBA, Wilsele (BE)

(72) Inventors: Kim Marivoet, Lovenjoel (BE); Ives Aerts, Heverlee (BE); Pepijn Van Eeckhoudt, Kessel-Lo (BE)

(73) Assignee: DATADOBI CVBA, Wilsele (BE)

( * ) Notice: Subject to any disclaimer, the term of this patent is extended or adjusted under 35 U.S.C. 154(b) by 0 days.

(21) Appl. No.: 17/042,584

(22) PCT Filed: Mar. 18, 2019

(86) PCT No.: PCT/EP2019/056687
§ 371 (c)(1),
(2) Date: Sep. 28, 2020

(87) PCT Pub. No.: WO2019/185389
PCT Pub. Date: Oct. 3, 2019

(65) Prior Publication Data
US 2021/0019072 A1    Jan. 21, 2021

(30) Foreign Application Priority Data

Mar. 30, 2018  (EP) .................................... 18165329

(51) Int. Cl.
*G06F 3/06* (2006.01)
(52) U.S. Cl.
CPC .......... *G06F 3/0647* (2013.01); *G06F 3/0604* (2013.01); *G06F 3/067* (2013.01); *G06F 3/0659* (2013.01)

(58) Field of Classification Search
CPC ..... G06F 3/0647; G06F 16/119; G06F 16/183
See application file for complete search history.

(56) References Cited

U.S. PATENT DOCUMENTS

| 7,925,627 B1 | 4/2011 | Brown et al. |
| 9,430,483 B1 * | 8/2016 | Cowan ................ G06F 16/1827 |
| 2006/0161746 A1 | 7/2006 | Wong et al. |

OTHER PUBLICATIONS

Extended European Search report from corresponding EP Application No. EP18165329.6, dated May 25, 2018.
International Search Report and Written Opinion from PCT Application No. PCT/EP2019/056687, dated Jun. 4, 2019.

* cited by examiner

*Primary Examiner* — Gary W. Cygiel
(74) *Attorney, Agent, or Firm* — Workman Nydegger

(57) ABSTRACT

A computer-implemented method is provided for generating a sequence of commands for replicating data on a source storage system to a destination storage system. The source and destination storage system support a first and a second remote file access protocol. The method involves i) scanning a directory of the source storage system for file system objects by the first and second remote file access protocol thereby obtaining a respective first and second representation of the file system objects; and ii) generating the sequence of commands based on the first and second representation and based on a predetermined rule set comprising rules for generating a command for replicating a file system object depending on a difference in representation of file system objects by the first and second remote file access protocol.

14 Claims, 2 Drawing Sheets

DATA MIGRATION BETWEEN STORAGE SYSTEMS USING DIFFERENT PROTOCOLS

TECHNICAL FIELD

Example embodiments relate to the generation of commands for replicating data from a source storage system to a destination storage system. More particular, it relates to the case where the source and destination storage system support multiple remote file access protocols.

BACKGROUND

Data storage systems allow storage of digital files and remote access by a heterogeneous group of users or clients. A data storage system may range from a single drive network-attached storage (NAS) to a multi-server data storage system offering petabytes of redundant data storage accessible by thousands of users, clients and services.

Data storage systems provide file access to several types of connecting clients by offering file access over different remote file access protocols. A remote file access protocol allows creating, editing or removing files on a data storage system. A remote file access protocol may also allow managing further attributes related to the stored files such as ownership information, access information, type information etc. Examples of remote file access protocols are the Apple Filing Protocol (AFP), the Web Distributed Authoring and Versioning (WebDAV) protocol, the Server Message Block (SMB) protocol, the Common Internet File System (CIFS) protocol, the File Transfer Protocol (FTP), the Network File System (NFS) and the SSH file transfer protocol (SFTP).

In some use cases, a part or the complete content of a first source data storage system is to be replicated onto a second destination data storage system. One such use case is data migration wherein the source data storage system is decommissioned after all data has been replicated on the destination data storage system. Another such use case is data backup wherein an incremental copy of the source data storage system is made at regular time intervals in order to ensure that a backup of the data is available. In both use cases, incremental copies may be made wherein only the differences between the source and destination storage system are copied.

One way to perform such a replication of data from a first source data storage system to a second destination data storage system is by first scanning one or more directories of the source data storage system and by obtaining therefrom a listing of files and directories that are to be copied to the destination storage system. Optionally, for incremental copies, also the destination storage may be scanned to derive a listing of files or directories that are to be replaced, edited or deleted at the destination storage system. From this listing, a sequence of commands is generated for replicating the files of interest onto the second storage system, e.g. by copying, deleting or updating files.

A problem with the above way of performing a copy is that the duplicated data at the destination storage system will not perfectly match with the source storage system. This is due to the fact that the files and directories on the source storage system may have been created by any of the supported remote file access protocols. Because of this, the destination storage system may comprise duplicates with different file names, files with the wrong file names, files with a wrong file type, corrupted files or complete directories may even be missing.

SUMMARY OF THE INVENTION

It is an object of the present invention to overcome the above identified problems and to provide a solution for generating a sequence of commands for replicating data from a source storage system onto a destination storage system that matches with the different supported file access protocols.

This object is achieved, according to a first aspect, by a computer-implemented method for generating a sequence of commands for replicating data from a source storage system onto a destination storage system. The source and destination storage system supporting a first and a second remote file access protocol. The method comprising:

scanning a directory of the source storage system for file system objects by the first and second remote file access protocol thereby obtaining a respective first and second representation of the file system objects; and generating the sequence of commands based on the first and second representation and based on a predetermined rule set comprising rules for generating a command for replicating a file system object depending on a difference in representation of file system objects by the first and second remote file access protocol.

The scanning is thus performed according to different supported remote file access protocols which will result in a different representation of the content of the scanned directory, i.e., of the file system objects contained in the directory. The commands for replicating a certain file system object are then generated according to the rules of the rule set. These rules then provide the commands depending on how the first and second remote file access protocol represent the file system object itself and the other file system objects in the directory. As a result, the commands will replicate the file system object itself and not just a representation of the file system object according to the first and/or second remote file access protocol.

As a result, the replication of the file system object will not result in two different versions on the destination storage system. Furthermore, by the above method, it can be avoided that the replicated object is only an exact copy according to one of the protocols but not according to the other protocol. It is therefore an advantage that a replication according to the commands generated by the claimed method will result in a much more accurate replication of the file system objects. It is a further advantage that after the replication of the directory, a representation of the directory on the destination storage system according to each one of the access protocols will result in a same representation as on the source storage system.

According to an embodiment, the method further comprises generating error messages based on the first and second representation and based on the predetermined rule set; and wherein the rule set further comprises rules for generating the error message depending on a difference in representation of file system objects by the first and second remote file access protocol.

Sometimes, it is not always derivable what the exact file system object is on the source storage system or how the file system object can be replicated. Furthermore, one of the access protocols may also issue an error for certain file system objects when scanning a directory. In such cases, the rule set may generate error messages in order to report the inconsistencies or mismatches between the two protocols.

A remote file access protocol, e.g. the first one, may for example correspond to the Network File System, NFS, protocol.

A remote file access protocol, e.g. the second one, may for example correspond to the Common Internet File System, CIFS, protocol and/or the Server Message Block, SMB, protocol.

According to an example embodiment, the file system object further comprises a string name and the scanning then comprises retrieving string names of the respective file system objects by the first and second remote file access protocol.

A string name or file name is a string of characters according to a certain encoding that uniquely identifies a file system object within a certain directory. However, when listing the string names of file system objects according to different file access protocols, the actual names may differ between the protocols. By the claimed rule set, this difference is detected and solved during the generation of the commands.

Advantageously, the generating the sequence of commands then further comprises:

deriving, by the rule set, canonical string names for identical system objects with a different string name in the first and second representation of the file system objects;

deriving, by the rule set, commands to replicate the identified identical system objects by the canonical string name using the first or second remote file access protocol.

In other words, while the representation results in the two different file object names, the replication will be done based on a single file object name. It is thus an advantage that the creation of duplicates is avoided.

Similarly, the generating the error messages may further comprise:

deriving, by the rule set, canonical string names for identical system objects with a different string name in the first and second representation of the file system objects;

deriving, by the rule set, the error messages.

This way, mismatches that cannot be resolved by the rule set, are traceable and can be manually resolved afterwards.

The deriving the canonical string names may be based on at least one characteristic from the group consisting of:

a difference in case sensitivity for string names between the first and second remote file access protocol;

a difference in supported characters for string names between the first and second remote file access protocol;

a difference in supported structure for string names between the first and second remote file access protocol; and a difference in character encoding for string names between the first and second remote file access protocol.

According to an embodiment, the scanning comprises, using the first and second remote file access protocol, retrieving object types of the respective file system objects.

File system object types may differ depending on the used file access protocol. Furthermore, there may be no one-to-one relationship between an object type according to the first protocol and an object type according to the second protocol. Therefore, because of this mismatch, scanning by only one of the protocols may not reveal all information on the object type.

The generating the sequence of commands may then further comprise:

deriving, by the rule set, a canonical object type for identical system objects with a different object type in the first and second representation of the file system objects; and deriving, by the rule set, commands to replicate the identified identical system objects by the canonical object type using the first or second remote file access protocol.

This ensures the best replication of the object's type, i.e., ensuring that the different object types of the object at the destination storage system is preserved for both file access protocols.

The object type of a file system object according to the one of the remote file access protocols may for example comprise at least one of the group consisting of:

a named pipe;
a block device;
a character device;
a file;
a directory;
a symbolic link; and
an error.

The object type of a file system object according to the other of the remote file access protocols may then for example comprise at least one of the group consisting of:

a file;
a directory;
a mountpoint; and
an error.

According to a second aspect, the invention relates to a computer program product comprising computer-executable instructions for performing the method according to the first aspect when the program is run on a computer.

According to a third aspect, the invention relates to a computer readable storage medium comprising the computer program product according to the second aspect.

According to a fourth aspect, the invention relates to a data processing system programmed for carrying out the method according to the first aspect.

DETAILED DESCRIPTION OF EMBODIMENT(S)

Example embodiments relate to the replication of content or data in a file system directory from one source storage system to another destination storage system. A data storage system provides file access to several types of clients or users by offering file access over different remote file access protocols. A remote file access protocol may allow creating, editing or removing files on a data storage system. A remote file access protocol may also allow managing further metadata or attributes related to the stored files such as ownership information, access information, type information etc. Examples of remote file access protocols are the Apple Filing Protocol (AFP), the Web Distributed Authoring and Versioning (WebDAV) protocol, the Server Message Block (SMB) protocol, the Common Internet File System (CIFS)

protocol, the File Transfer Protocol (FTP), the Network File System (NFS) and the SSH file transfer protocol (SFTP).

For example, the Network File system may relate to any one of the following protocols: version 2 of the Network File System protocol as defined in RFC 1094; version 3 of the Network File System protocol as defined in RFC 1813; version 4 of the Network File System protocol as defined in RFC 3010, 3530, or 7530; version 4.1 of the Network File System protocol as defined in RFC 5661; and version 4.2 of the Network File System protocol as defined in RFC 7862. NFS allows handling several types of file system objects such as for example a named pipe, a block device, a character device, a file, a directory and a symbolic link. NFS may also return an error if it encounters an unsupported file system object type.

Similarly, the SMB protocol may relate to version 1, 2 or 3 of the Server Message Block, SMB, protocol. SMB supports different file system objects such as for example a file, a directory, a mountpoint, a symbolic link and a junction point. SMB may return an error message when encountering an unsupported file system object.

Figure 1:
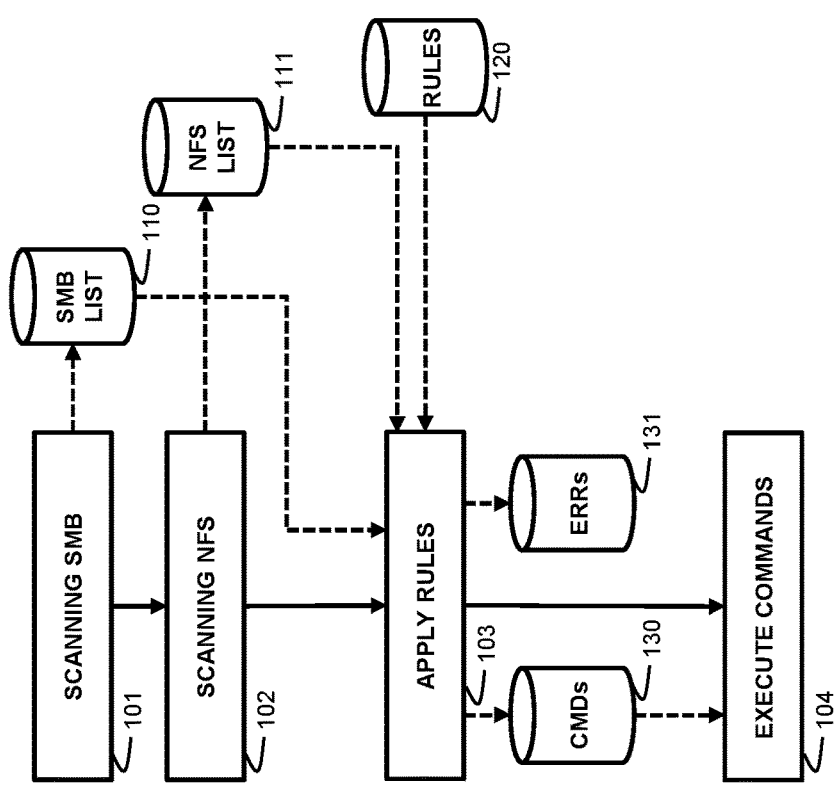
FIG. 1 illustrates steps according to an example embodiment for replicating data from a source storage system to a destination storage system.

FIG. 1 illustrates steps performed for replicating content from such a source storage system to a such a destination storage system according to an example embodiment. The content may comprise all the content on the source storage system or may comprise the content of a single directory. The example will be further illustrated by assuming that NFS is a first remote file access protocol supported by the storage systems and SMB is a second remote file access protocol supported by the storage systems. Therefore, file system objects such as files or directories may reside on the source storage and be created by either one of the file access protocols.

In a first step 101, a scanning of the content is performed over the SMB protocol resulting in a list 110 of the content. The list comprises the string names of the file system objects in the scanned directory. A string name or file name is a string of computer encoded characters that uniquely identifies the file system object. A string name may for example be formatted as a relative of absolute Unified Resource Identifier or, shortly, a URI. By the string name, the file system object may be accessed or retrieved by the SMB file access protocol. Apart from the string name, the list also comprises metadata or attributes for each of the file system objects. Metadata comprises further information on the files system object such as for example the type of the file system object, the access permissions of the file system object, or the owner permissions of the file system object.

The method then proceeds to the second step 102 where the same content is scanned again but now according to the NFS file access protocol. This also produces a list 111 of the content comprising the string names of the file system objects and further metadata on the file system objects according to the NFS protocol. As both lists 110 and 111 list the same content but according to a different protocol, they may be considered as different representations of the content that is to be replicated. Steps 101 and 102 may further be performed sequentially or in parallel.

The method then proceeds to step 103 in which a set of predefined rules 120 are applied to the scanned content lists 110, 111. The rules 120 comprise rules for generating one or more commands for replicating the scanned content on the destination storage system. Such a command may for example correspond to a copying command for copying file system objects from one of the lists 110, 111 to the destination storage system according to the SMB or NFS protocols. The command may take the string name as listed in one of lists 110, 111 for identifying the file system object that is to be transferred. Such a command may also correspond to a command for setting the access permissions or owner permissions according to either one or both the SMB and NFS protocol.

As the SMB and NFS protocol have different conventions on the use of the string names and on the object types, there may be a mismatch between the lists 110 and 111, i.e., there may be a mismatch in the string name, the object type, the access permissions or owner rights of a respective file system object. Because of this mismatch, a replication of the content solely based on either one of the lists 110 and 111 will not result in an exact replication of the content on the destination storage system. Also, a replication based on a replication over both the SMB and NFS will again not result in an exact replication because it will result in a duplication of file system objects that have a different string name in the lists 110, 111, while they are actually identical on the source storage system. To address this, the rules take into account the mismatch between both the file access protocols and define how to replicate a file system object based on the type of mismatch. The definition of the rules may be based on the type of file access protocols, on the specific type or vendor of the storage system or may be based on preferences selected by a user. Sometimes, no one-to-one relationship may be identifiable between a mismatch and the actual file object on the source storage system. In such a case a rule may specify to generate an error indicative for the encountered unresolvable mismatch. By applying the rules 120, step 103 generates the list of appropriate commands 130 for replicating the scanned content. Furthermore, step 103 may also generate a list 131 with the encountered errors. The errors may then be resolved manually, for example by a user.

Thereafter, the method may proceed to a next step 104 upon which the generated commands are executed thereby performing the actual replication. Alternatively, steps 101, 102 and 103 may also be performed iteratively for each directory encountered during a previous scanning step, thereby going deeper and deeper within the file system's directory tree until no further directories are encountered. During each iteration, the commands and errors generated in step 103 by the rules 120 may be appended to the respective lists 130 and 131. Only when a complete folder structure of the storage system has been scanned, all commands are executed according to step 104.

Figure 2:
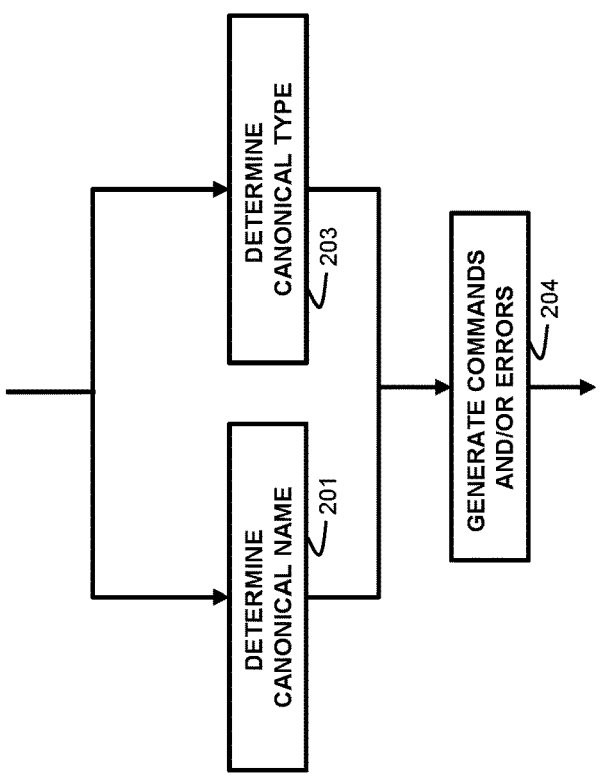
FIG. 2 illustrates steps for generating commands for replicating data from a source storage system to a destination storage system based on a rule set.

FIG. 2 illustrates a further example embodiment for performing step 103 of FIG. 1. Sub-step 201 illustrates the applying of the rules 120 according to a mismatch in the naming of the file system objects in lists 110 and 111, i.e. between the first and second protocol. In the sub-step 120 a mismatch between the naming may be identified by the rules 120, i.e., deferring names of the same file system objects are detected from lists 110, 111. The rules for detecting the mismatch may for example be based on a difference in case sensitivity for string names between the first and second remote file access protocol; on a difference in supported characters for string names between the first and second remote file access protocol; on a difference in supported structure for string names between the first and second remote file access protocol; and/or on a difference in character encoding for string names between the first and second remote file access protocol.

Table 1 below illustrates possible mismatches in the string names between the NFS and SMB protocols. This illustrates that one can make no assumptions on how filenames retrieved by the SMB protocol will look like if there are multiple files or directories with the same name present.

Therefore, when opening such a file using the scanned SMB file names, it is undefined which actual file or directory will be opened or retrieved. The table further illustrates that the SMB protocol is more restrictive with respect to the supported characters, i.e., SMB does not allow the use of any one of the following characters: \/: *?"< >|. Accessing a file system object by a string name having invalid characters will result in an error. When scanning a directory containing file system objects with invalid characters, the invalid characters will be replaced by other supported character. The SMB protocol itself does not specify how this replacement is to be done. The replacement is therefore dependent on the implementation of the protocol. Other structural restrictions in SMB are that names may not end with a punctuation '.' or with a space while NFS allows this. Furthermore, SMB uses UTF-16 encoding for its filenames while NFS uses the encoding that was applied by the client. As a result, a file may have a different name when accessed by NFS or SMB. The rules 120 may then define how to derive a canonical name for file system objects of lists 110 and 111, i.e., the file name by which the replication command will be executed. For example, as shown in the fourth column of Table 1, when having SMB and NFS as protocols, the rules may define to create all file system objects by their NFS file name over the NFS protocol because NFS supports a wider range of file names than SMB.

file system type is unknown or when the file system object is corrupt. SMB on the other hand distinguishes, among others, between a file, a directory, a symbolic link, a junction point and a mount point. Furthermore, also SMB may generate an error when the file system type is unknown or when the file system object is corrupt. Apart from having different object types, similar object types may have a different meaning. For example, a symbolic link in SMB does not have the same meaning as a symbolic link in NFS.

To address mismatches in object types between the file access protocols, the method may also comprise a sub-step 203 in which a canonical object type is determined based on both lists 110, 111. A canonical object type is an object type of either one of the file access protocols that will be used for replicating the corresponding file system object such that the file system object is replicated onto the destination storage in the most accurate way. Table 2 below illustrates the rules for possible mismatches in the file object types between the NFS and SMB protocols. The first column shows different object types according to the NFS protocol as retrieved from list 111; the second column shows the corresponding object types according to the SMB protocol as retrieved from list 110; the third column then shows the rule for determining the canonical object type. A rule may also take into account configurable parameters for determining the canonical object type. For example, in Table 2 the object type may

TABLE 1

Example mismatches in file names between NFS and SMB and corresponding rule

| NFS filename | SMB filename | Mismatch | Rule |
|---|---|---|---|
| file1.txt | file1.txt | Mismatch in case sensitivity between SMB and NFS | Use NFS name |
| File1.txt | file~1.txt | | |
| FILE1.txt | file~2.txt | | |
| dirinvalid:postfix | dirinvalid__postfix~1 | Unsupported characters in SMB | |
| File.txt. | <ERROR> | SMB does not support file names ending with a period. | |

Apart from a mismatch between the first and second file access protocol, there may also be a mismatch in types of objects. For example, NFS distinguishes, among others, the following file system objects types: a named pipe; a block device; a character device; a file; a directory; and a symbolic link. Furthermore, NFS may also generate an error when the defer depending on a user configurable setting about the traversal of mountpoints. In this example, this refers to how relative or absolute links to other directories or volumes must be handled, i.e. whether they should also be replicated onto the destination storage system.

TABLE 2

Example occurrences in file types in NFS and SMB and corresponding rules for replication

| NFS type | SMB type | Rule |
|---|---|---|
| FILE | FILE | This is a regular file; Treat as FILE |
| DIRECTORY | DIRECTORY | This is a regular directory; Treat as DIRECTORY |
| DIRECTORY | MOUNTPOINT | This is an SMB volume junction point; Treat as DIRECTORY when MOUNTPOINTS may be traversed; Treat as MOUNTPOINT when MOUNTPOINTS may not be traversed. |
| SYMLINK | SYMLINK | This is a symbolic link; Treat as a SYMLINK |
| SYMLINK | MOUNTPOINT | This is an absolute UNIX type SYMLINK; Treat as DIRECTORY when MOUNTPOINTS may be traversed; Treat as SYMLINK otherwise. |
| SYMLINK | NOT(MOUNTPOINT) | This is a SYMLINK resolved by SMB file |

TABLE 2-continued

Example occurrences in file types in NFS and
SMB and corresponding rules for replication

| NFS type | SMB type | Rule |
| --- | --- | --- |
| | | server;<br>Treat as a SYMLINK. |
| MOUNTPOINT | <ANY> | This is a mounted file system;<br>Treat as DIRECTORY when<br>MOUNTPOINTS may be traversed;<br>Treat as SYMLINK otherwise. |
| SOCKET | <ANY> | UNIX domain socket;<br>Treat as NFS socket. |
| FIFO | <ANY> | This is a named pipe;<br>Treat as a NFS PIPE. |
| BLOCK_DEV | <ANY> | This is a block device;<br>Treat as a NFS BLOCK_DEV. |
| CHAR_DEV | <ANY> | This is a character device;<br>Treat as a NFS CHAR_DEV. |

After execution of sub-steps 201 and 203, the method proceeds to sub-step 204 where the commands for replicating the content are generated according to the determined canonical file type and object type. The replication of a single file system object may further result in multiple commands because apart from the creation of the file, also other attributes such as ownership or access permissions must still be set. For example, a replication of a certain file may result in the following commands:

Copy the file by the obtained canonical file name as the obtained canonical object type by the NFS file access protocol;

Copy the SMB access permissions of the source file onto the replicated file by the SMB protocol;

Copy the NFS access permission of the source file onto the replicated file by the NFS protocol.

The above step may be performed for both migration or backup of data from a source storage system to a destination storage system. During backup or during migration, incremental copies may be made form the source to destination storage system. In this case, data already resides on the destination storage system and only the differing files must be copied, i.e. files which do not yet exist on the destination system or files which have been modified since a previous replication of the data. In this case, the scanning steps 101 and 102 may be performed on both the source and destination storage system. Then, files that are identical between the source and destination storage system are removed from the lists 110, 111. Alternatively, the files may be removed after sub-steps 201, 203. This way, only commands for differing files will be generated. Furthermore, rules 120 may comprise specific rules for incremental copies. For example, rules for conditions where there is a conflict between a source and destination file object.

Figure 3:
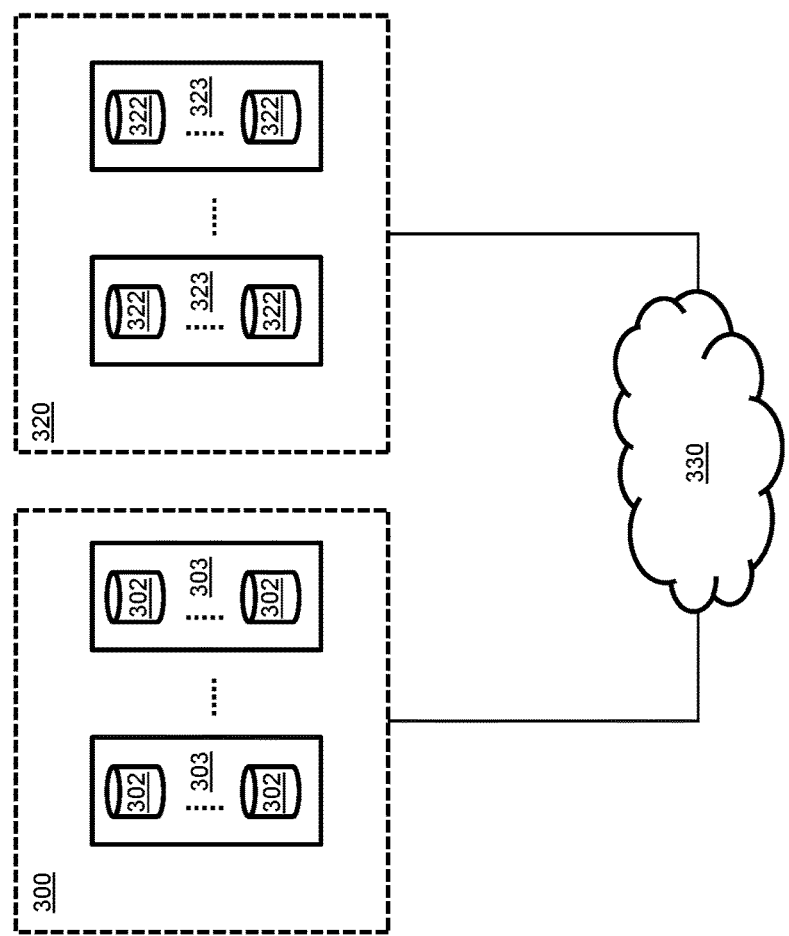
FIG. 3 illustrates a source and destination storage system according to an example embodiment suitable for use in the steps illustrated in FIG. 1 and FIG. 2.

FIG. 3 illustrates an exemplary embodiment of a source 300 and destination 320 storage systems suitable for performing the step according to the example embodiments onto. The source storage system 300 may comprise one or more storage servers 303 each housing one or more digital storage means 302. Similarly, the destination system 320 may comprise one or more a storage servers 323 each housing one or more digital storage means 322. The storage servers 303 and 323 may be housed in a same or different data centre inside or outside a company's data network. The storage systems 300 and 320 may offer data storage and access to users, clients and services. Such access may be done over the network 330. A variety of the above described remote file access protocols may be used for accessing data stored one the storage systems 300 and 320. Companywide storage systems may offer a huge data storage capacity and may be deployed and/or maintained by external storage providers such as for example NetApp, EMC or Hitachi.

The data to be replicated by the above steps from the system 300 to the system 320 comprises a set of files organized in directories according to a file system. These files may be data files belonging to users or groups, system files used by an operating system or applications files used by and for applications.

Figure 4:
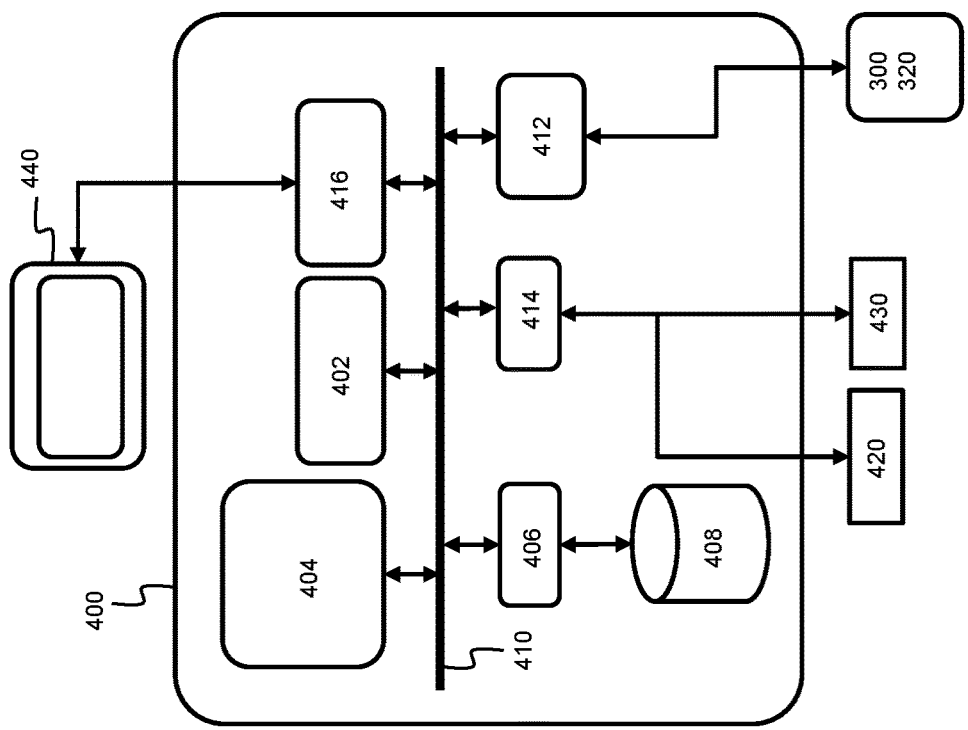
FIG. 4 illustrates a computing system according to an example embodiment suitable for performing the steps of FIG. 1 and FIG. 2.

FIG. 4 shows a suitable computing system 400 for performing the steps according to the above example embodiments. Computing system 400 may in general be formed as a suitable general-purpose computer and comprise a bus 410, a processor 402, a local memory 404, one or more optional input interfaces 414, one or more optional output interfaces 416, a communication interface 412, a storage element interface 406 and one or more storage elements 408. Bus 410 may comprise one or more conductors that permit communication among the components of the computing system 400. Processor 402 may include any type of conventional processor or microprocessor that interprets and executes programming instructions. Local memory 404 may include a random access memory (RAM) or another type of dynamic storage device that stores information and instructions for execution by processor 402 and/or a read only memory (ROM) or another type of static storage device that stores static information and instructions for use by processor 402. Input interface 414 may comprise one or more conventional mechanisms that permit an operator to input information to the computing device 400, such as a keyboard 420, a mouse 430, a pen, voice recognition and/or biometric mechanisms, etc. Output interface 416 may comprise one or more conventional mechanisms that output information to the operator, such as a display 440, a printer, a speaker, etc. Communication interface 412 may comprise any transceiver-like mechanism such as for example one or more Ethernet interfaces that enables computing system 400 to communicate with other devices and/or systems, for example mechanisms for communicating with the source and destination storage systems 300 and 320 of FIG. 3. The communication interface 412 of computing system 400 may be connected to such another computing system by means of a local area network (LAN) or a wide area network (WAN) such as for example the internet. Storage element interface 406 may comprise a storage interface such as for example a Serial Advanced Technology Attachment (SATA) interface or a Small Computer System Interface (SCSI) for connecting bus 410 to one or more storage elements 408, such as one or more local disks, for example SATA disk drives, and control the reading and writing of data to and/or from these storage elements 408. Although the storage elements 408 above is described as a local disk, in general any other suitable computer-readable media such as a removable magnetic disk, optical storage media such as a CD or DVD-ROM disk, solid state drives and/or flash memory cards could be used.

The steps illustrated by the above example embodiments may be implemented as programming instructions stored in local memory 404 of the computing system 400 for execution by its processor 402. Alternatively, the instructions may be stored on the storage element 408 or be accessible from another computing system through the communication interface 412.

The system 400 may be connected to the network 330 of FIG. 3 by its communication interface 412. This way the system 400 has access to both the source storage system 300 and destination storage system 320 for execution of the steps according to the various example embodiments. The steps according to the above example embodiments may also be performed as instructions on one of the servers 303, 323.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A computer-implemented method for generating a sequence of commands for replicating data on a source storage system to a destination storage system; and wherein the source and destination storage system support a first and a second remote file access protocol, the method comprising:
scanning a directory of the source storage system for file system objects by the first and second remote file access protocol thereby obtaining a respective first and second representation of the file system objects; and
generating the sequence of commands based on the first and second representation and based on a predetermined rule set comprising rules for generating a command for replicating a file system object depending on a difference in representation of file system objects by the first and second remote file access protocol.

2. The method according to claim 1 further comprising generating error messages based on the first and second representation and based on the predetermined rule set; and
wherein the rule set further comprises rules for generating the error message depending on the difference in representation of file system objects by the first and second remote file access protocol.

3. The method according to claim 1 wherein the first remote file access protocol corresponds to the Network File System, NFS, protocol.

4. The method according to claim 1 wherein the second remote file access protocol corresponds to the Common Internet File System, CIFS, protocol and/or the Server Message Block, SMB, protocol.

5. The method according to claim 1 wherein a file system object comprises a string name; and
wherein the scanning comprises retrieving string names of the respective file system objects by the first and second remote file access protocol.

6. The method according to claim 5 wherein the generating the sequence of commands further comprises:
deriving, by the rule set, canonical string names for identical system objects with a different string name in the first and second representation of the file system objects;
deriving, by the rule set, copying commands to copy the identified identical system objects by the canonical string using the first or second remote file access protocol.

7. The method according to claim 2 wherein the generating the error messages further comprises:
deriving, by the rule set, canonical string names for identical system objects with a different string name in the first and second representation of the file system objects;
deriving, by the rule set, the error messages.

8. The method according to claim 6 wherein the deriving the canonical string names is based on at least one characteristic from the group consisting of:
a difference in case sensitivity for string names between the first and second remote file access protocol;
a difference in supported characters for string names between the first and second remote file access protocol;
a difference in supported structure for string names between the first and second remote file access protocol; and
a difference in character encoding for string names between the first and second remote file access protocol.

9. The method according to claim 1 wherein the scanning comprises, using the first and second remote file access protocol, retrieving object types of the respective file system objects.

10. The method according to claim 9 wherein the generating the sequence of commands further comprises:
- deriving, by the rule set, a canonical object type for identical system objects with a different object type in the first and second representation of the file system objects; and
- deriving, by the rule set, copying commands to copy the identified identical system objects by the canonical string using the first or second remote file access protocol.

11. The method according to claim 9 wherein the object type of a file system object according to the first remote file access protocol comprises at least one of the group consisting of:
- a named pipe;
- a block device;
- a character device;
- a file;
- a directory;
- a symbolic link; and
- an error.

12. The method according to claim 9 wherein the object type of a file system object according to the second remote file access protocol comprises at least one of the group consisting of:
- a file;
- a directory;
- a mountpoint; and
- an error.

13. A non-transitory computer readable storage medium comprising computer-executable instructions which, when executed by a computing system, perform the method according to claim 1.

14. A data processing system comprising at least a processor and a non-transitory computer readable storage medium, wherein the data processing system is programmed for carrying out the method according to claim 1.

* * * * *